US008771604B2

(12) United States Patent
Fitzsimmons et al.

(10) Patent No.: US 8,771,604 B2
(45) Date of Patent: Jul. 8, 2014

(54) GASIFIER LINER

(75) Inventors: Mark A. Fitzsimmons, Reseda, CA (US); Stephen Arthur Yows, Moorpark, CA (US); Steven P. Fusselman, Simi Valley, CA (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 1108 days.

(21) Appl. No.: 11/702,999

(22) Filed: Feb. 6, 2007

(65) Prior Publication Data

US 2008/0187877 A1 Aug. 7, 2008

(51) Int. Cl.
*B01J 19/00* (2006.01)
*C10J 3/76* (2006.01)
*C10J 3/00* (2006.01)

(52) U.S. Cl.
USPC .................................. 422/198; 48/67; 48/119

(58) Field of Classification Search
USPC .......... 422/198, 200–204; 110/229, 338, 336; 48/67, 119, 62 R, 89
See application file for complete search history.

(56) References Cited

U.S. PATENT DOCUMENTS 3,918,255 A 11/1975 Holden
3,954,389 A 5/1976 Szetela
4,188,915 A * 2/1980 Kummel et al. .............. 122/6 A
4,304,267 A * 12/1981 Campbell, Jr. ................ 138/149
4,732,796 A 3/1988 Schatschneider
4,835,831 A 6/1989 Melton
4,840,131 A 6/1989 Meumann et al.
5,248,483 A * 9/1993 Carter ........................... 422/187
5,624,256 A 4/1997 Pfeiffer et al.
6,085,515 A 7/2000 Walz et al.
6,145,452 A 11/2000 Heger et al.
6,418,973 B1 * 7/2002 Cox et al. .................. 139/383 R
6,536,950 B1 * 3/2003 Green et al. .................. 374/179
6,627,019 B2 9/2003 Jarmon et al.
6,844,091 B2 1/2005 Denham et al.
6,920,836 B2 * 7/2005 Sprouse ........................ 110/336
7,547,423 B2 * 6/2009 Sprouse et al. ............... 422/198
7,740,671 B2 * 6/2010 Yows et al. ....................... 48/67
2005/0072341 A1 4/2005 Sprouse
2007/0062117 A1 * 3/2007 Schingnitz et al. ............. 48/210
2008/0172941 A1 * 7/2008 Jancker et al. .................... 48/73

FOREIGN PATENT DOCUMENTS

CN 1807956 7/2006
DE 2805098 8/1979
DE 8407841 6/1984
EP 0441526 8/1991
WO 2006075958 7/2006

OTHER PUBLICATIONS

Official Search Report and Written Opinion of the European Patent Office in counterpart foreign Application No. EP 08250420 filed Feb. 5, 2008.
English Translation of Japanese Office Action mailed Feb. 12, 2013 in related Japanese Patent Application No. 2008-018474 filed Jan. 30, 2008.

* cited by examiner

*Primary Examiner* — Bryon Gehman
*Assistant Examiner* — Shawn M Braden
(74) *Attorney, Agent, or Firm* — Carlson, Gaskey & Olds, P.C.

(57) ABSTRACT

A liner for use within a gasifier vessel includes a plurality of elongated channels and a plurality of ceramic sheaths. The elongated channels pass coolant through the gasifier. The ceramic sheaths surround the elongated channels.

22 Claims, 5 Drawing Sheets

GASIFIER LINER

BACKGROUND OF THE INVENTION

The gasification process involves turning coal or other carbon-containing materials into synthesis gas. Because coal costs less than natural gas and oil, there is a large economic incentive to develop gasification technology. An issue with existing gasification technologies is that they generally have high capital costs and/or relatively low availability. Availability refers to the amount of time the equipment is on-line and making products. One cause of low availability is complex or short-lived gasifier liner designs. Examples of liners currently being used in gasifiers are refractory liners, membrane liners, and regeneratively cooled liners. Refractory liners require annual replacement of the refractory, with an availability of approximately 90%. While membrane liners have a longer life than refractory liners, the complexity of the liner can increase the cost of the gasifier up to 2 to 3 times.

Regeneratively cooled liners are also used in the gasification process and generally present a lower cost, longer life alternative to refractory liners and membrane liners. These benefits are a result of freezing a layer of slag on the wall of the regeneratively cooled liner. Regeneratively cooled liners can significantly reduce the cost of electricity, hydrogen, and synthesis gas produced by gasification plants when compared to gasification plants using refractory liners and membrane liners. An example of a regeneratively cooled liner is disclosed in U.S. Pat. No. 6,920,836 (Sprouse), which is herein incorporated by reference.

While regeneratively cooled liners provide significant benefits in gasification technology when compared to refractory liners and membrane liners, one of the technical challenges of using regeneratively cooled liners is managing the thermal growth of the liner. The liner, which may be formed of ceramic, is usually attached to a metal backing structure of the gasifier. Thus, as the temperature inside the gasifier increases, the rates of thermal expansion of the ceramic liner and the metal backing structure are mismatched.

Another challenge with regard to regeneratively cooled liners is the specific implementation of the metal/ceramic joining required to establish a closed-loop (regenerative) cooling circuit. In addition, there is a risk that a small crack in the liner could alter the performance and efficiency of the gasifier, eliminating the ability to co-generate power.

Thus, a need exists for a gasifier liner that offers the advantages of a ceramic lining while addressing the challenges of ceramic/metal joining and ceramic/metal thermal growth mismatch.

BRIEF SUMMARY OF THE INVENTION

A liner having controlled thermal expansion for use within a gasifier vessel includes a plurality of elongated channels and a plurality of ceramic sheaths. The elongated channels pass coolant through the gasifier. The ceramic sheaths surround the elongated channels.

DETAILED DESCRIPTION

Figure 1:
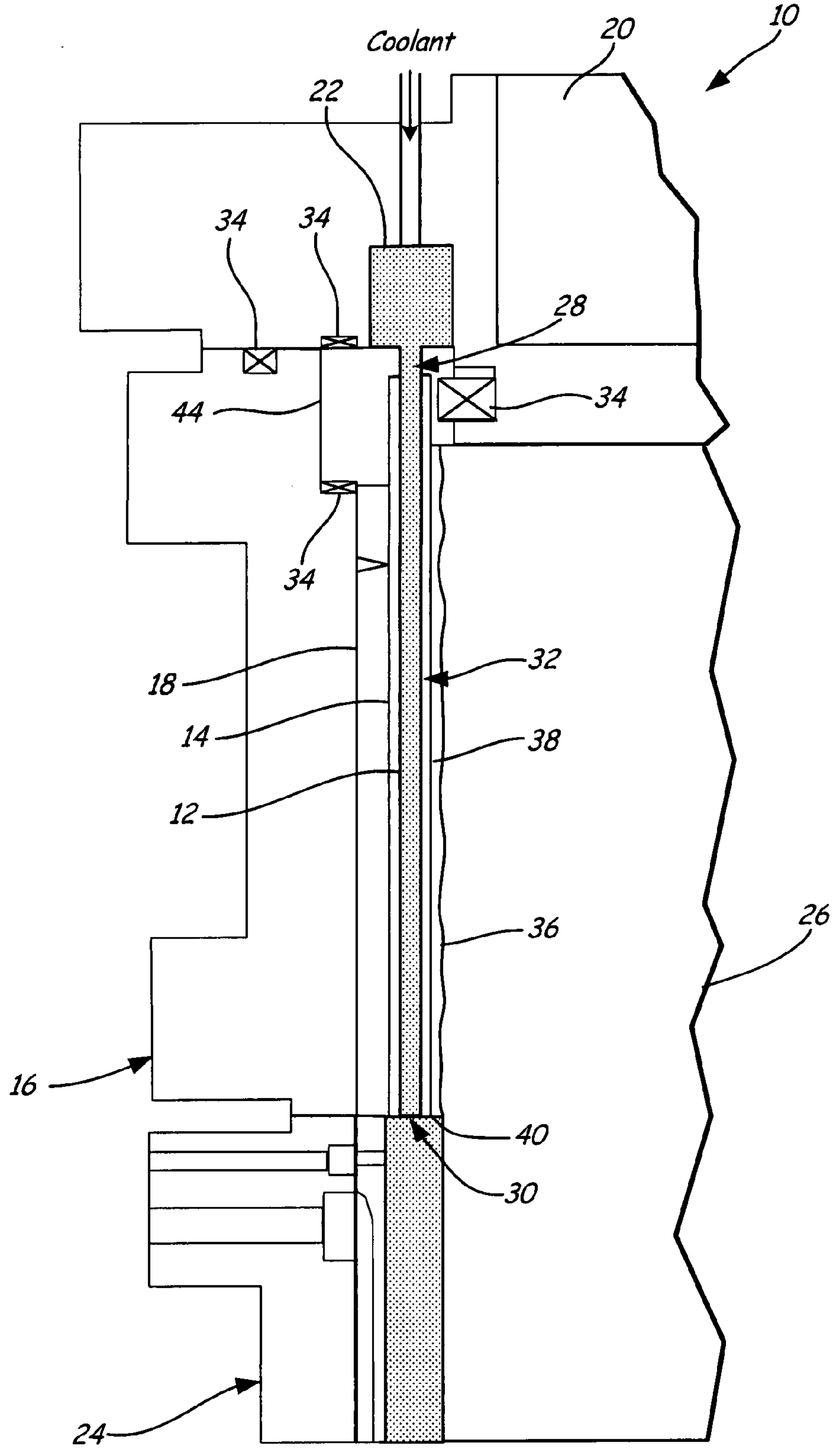
FIG. 1 is a representative embodiment of a gasifier having a liner.

FIG. 1 shows a cross-sectional view of gasifier reactor 10, generally including coolant channels 12, representative liner 14, metal pressure vessel 16, insulator 18, injector 20, coolant inlet manifold 22, quench section 24, and reaction chamber 26. Using liner 14 in gasifier reactor 10 provides a low cost alternative to other liners and extends the life of gasifier reactor 10. Various technical risks of the gasification process are also reduced with liner 14 due to the reduction or elimination of metal/ceramic joining issues, crack propagation causing leakage, as well as thermal growth mismatches. The configuration of liner 14 in gasifier reactor 10 also allows for coolant channels 12 to have increased structural integrity. Liner 14 may be used in both dump-cooled liner cooling schemes, where the coolant is dumped into the gasifier effluent at the aft end of the gasifier, and in regeneratively-cooled liner cooling schemes, where the coolant is circulated in a closed loop.

Coolant channels 12 extend along a length of vessel 16 and have a head end 28, aft end 30, and body 32. Coolant channels 12 are connected to mounting flange 44, which contacts vessel 16, injector 20, and coolant inlet manifold 22 by mechanical seals 34. As can be seen in FIG. 1, which depicts a dump-cooled liner configuration, coolant channels 12 are suspended in vessel 16 such that coolant channels 12 are free to expand and contract both axially and radially in response to any thermal changes within vessel 16. For a regeneratively-cooled liner configuration, aft ends 30 of coolant channels 12 are joined to a coolant exit manifold. In either case, liner 14 is not joined to coolant channels 12, thereby eliminating thermal growth mismatch and joining issues typical of joined ceramic and metal components. As the temperature inside reaction chamber 26 may reach between approximately 2000° F. (1093° Celsius, ° C.) and approximately 6000° F. (3316° C.), the temperature along coolant channels 12 and liner 14 must be maintained within acceptable limits by coolant flowing through coolant channels 12. In an exemplary embodiment, coolant channels 12 are formed of metal, are between approximately 10 feet and approximately 30 feet in length, and have an inner diameter of between approximately 1.5 inches and approximately 6 inches.

Liner 14 envelops coolant channels 12 shielding coolant channels 12 from the corrosive, high temperature environment of gasifier reactor 10. Liner 14 covers approximately 100% of coolant channels 12 exposed to the gasification reaction in reaction chamber 26. Any exposed metal of coolant channels 12 that is not covered by liner 14 is kept sufficiently cooled or protected by the face of injector 20 or by the quench spray in quench section 24 so that the metal does not corrode. In an exemplary embodiment, liner 14 may be formed of materials including, but not limited to: ceramics and ceramic matrix composites. The thermal expansion of a ceramic matrix composite sheath is between approximately 1.7 E-06 in/in-° F. and approximately 3.3 E-06 in/in-° F.

Vessel 16 is positioned above quench section 24 and contains reaction chamber 26. Vessel 16 houses coolant channels 12, liner 14, and insulator 18 of gasifier reactor 10. Insulator

18 is positioned between liner 14 and vessel 16 to help maintain the temperature of coolant channels 12, liner 14, and vessel 16 within operating limits. A suitable temperature range for liner 14 is between approximately 1000° F. (538° C.) and approximately 2000° F. (1093° C.). A particularly suitable temperature range for liner 14 is between approximately 1200° F. (649° C.) and approximately 1800° F. (982° C.). Although FIG. 1 depicts insulator 18 as being directly attached to liner 14, insulator 18 may optionally not be directly attached to liner 14.

Coolant inlet manifold 22 supplies the coolant to coolant channels 12 and is contained between Injector 20 and head ends 28 of coolant channels 12. To prevent coolant flowing from coolant inlet manifold 22 to coolant tubes 12 from leaking into vessel 16 or out of vessel 16 to the atmosphere, coolant tubes 12 are sealed where coolant channels 12 seal against injector 20, where coolant channels 12 seal against vessel 16, and where vessel 16 seals against injector 20. Head ends 28 of coolant channels 12 are attached to injector 20 over only a few inches, resulting in manageable loads between injector 20 and coolant channels 12. Although gasifier reactor 10 is discussed as including coolant inlet manifold 22, gasifier reactor 10 may alternatively be constructed without a manifold or with a manifold of different arrangement without departing from the intended scope of the invention.

In operation, coolant flows from injector 20 through coolant inlet manifold 22, where it is introduced into head ends 28 of coolant channels 12. Although there may be minor leakage of the coolant at the connection of coolant channels 12 and injector 20, and at the connection of coolant channels 12 and vessel 16, the leakage is acceptable because the coolant will eventually exit into vessel 16. In alternative configurations, coolant channels 12 may be joined into coolant manifolds, replacing the need for mechanical seals 34 to eliminate leakage. As the coolant passes through coolant channels 12 the coolant picks up heat from reaction chamber 26 and cools coolant channels 12. For a dump-cooled liner configuration, aft ends 30 of coolant channels 12 are suspended within vessel 16 and the coolant eventually dumps into vessel 16 immediately upstream of quench section 24. For a regeneratively-cooled liner configuration, aft ends 30 of coolant channels 12 are joined to a manifold that directs the coolant out of gasifier vessel 16. Examples of suitable coolants include, but are not limited to: steam, nitrogen, carbon dioxide, and synthesis gas. A suitable temperature range for the coolant is between approximately 100° F. (38° C.) and approximately 1200° F. (649° C.). A particularly suitable temperature range for a water coolant is between approximately 150° F. (66° C.) and approximately 400° F. (204° C.). A particularly suitable temperature range for gaseous coolants is between approximately 600° F. (316° C.) and approximately 1000° F. (760° C.).

The coolant flows through coolant channels 12 at a rate sufficient to freeze a slag layer 36 along an exposed inner surface 38 of liner 14. Slag layer 36 is formed from the ash content in the carbon-rich fuels flowing through reaction chamber 26. At the high temperatures in which gasifier reactor 10 operates, the ash becomes slag. The temperature of the coolant running through coolant channels 12 is low enough to keep liner 14 at a temperature to freeze slag layer 36 onto exposed inner surface 38. If pieces of liner 14 break off, slag layer 36 protects coolant channels 12 from abrasion by high velocity particulates and from chemical attack by gas phase reactive species in reaction chamber 26. Alternatively, if slag layer 36 is not deposited along exposed inner surface 38 of coolant channels 12, coolant channels 12 may be formed of bare metal that is hardened or coated to resist abrasion and that is cooled to achieve surface temperatures capable of withstanding chemical attack.

For a dump-cooled liner configuration, the exit velocity of the coolant from coolant channels 12 also provides a slag drip lip 40 at aft ends 30 of coolant channels 12. Slag drip lip 40 is a result of the expanding volume and rapid quench of the coolant exiting at aft ends 30 coolant channels 12 and prevents slag from building up at aft ends 30 of coolant channels 12. The presence of slag drip lip 40 thus reduces any maintenance time and cost that would be required to remove slag from aft ends 30 of coolant channels 12, as well as prevents slag from blocking the coolant from exiting coolant channels 12 and entering quench section 24.

Figure 2:
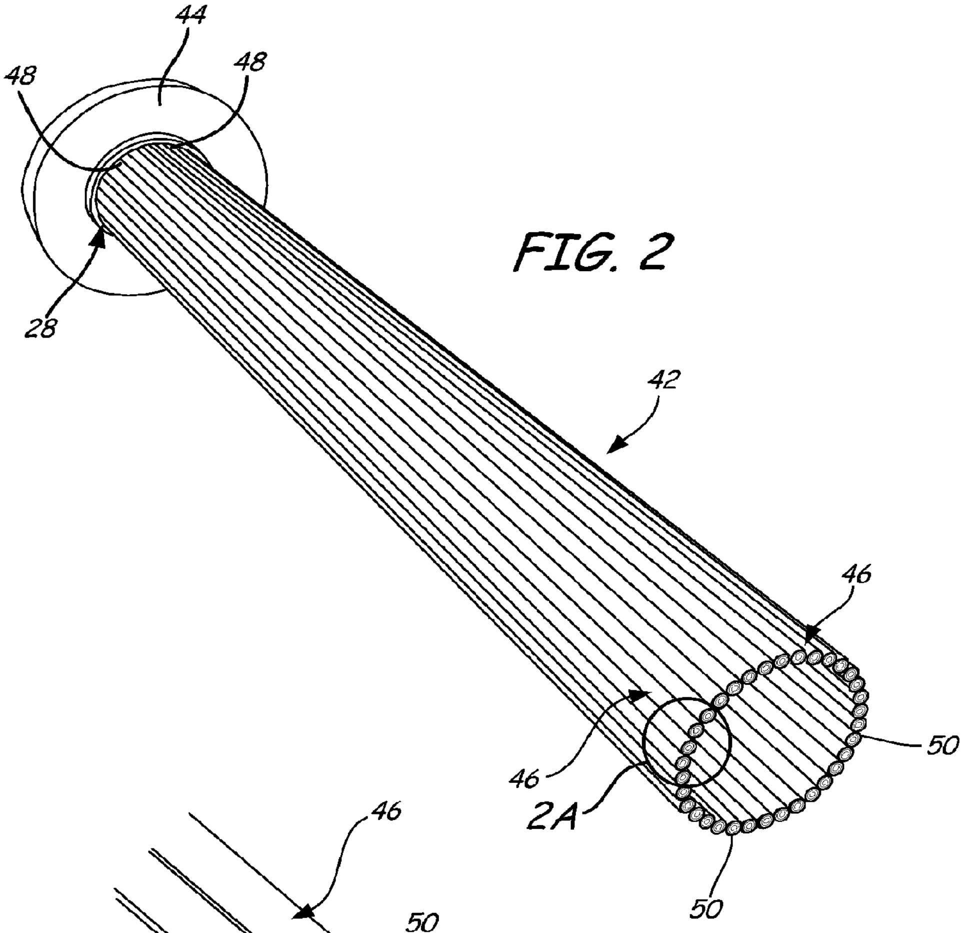
FIG. 2 is a perspective view of a first embodiment of coolant channels and liner.
Figure 2A:
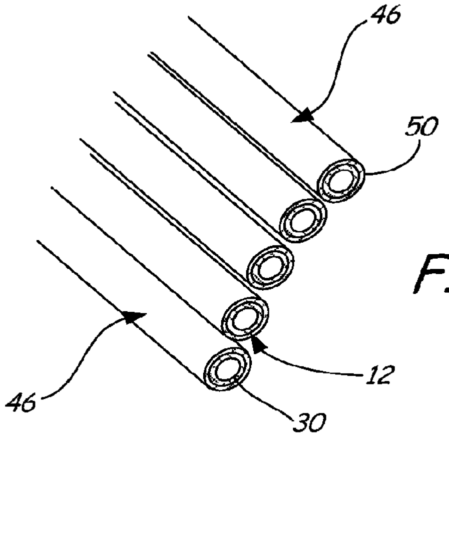
FIG. 2A is an enlarged perspective view of a portion of the coolant channels and liner of FIG. 2.

FIG. 2 shows a perspective view of a first embodiment of coolant channels 12 and liner 42 for a dump-cooled liner configuration, and FIG. 2A is an enlarged view of portion 2A of FIG. 2. FIG. 2 and FIG. 2A will be discussed together. As can be seen in FIG. 2, head ends 28 of coolant channels 12 are attached to injector 20 (shown in FIG. 1) by mounting flange 44, which has a circular cross-section. Thus, coolant channels 12 are positioned such that head ends 28 and aft ends 30 of all of coolant channels 12, respectively, are aligned with each other to form a circular cross-section. Liner 42 is fabricated from a plurality of sheaths 46 that are positioned over coolant channels 12. Each of sheaths 46 has a head end 48 and an aft end 50. Sheaths 46 are positioned around coolant channels 12 and have a length that is less than the length of coolant channels 12. Thus, a plurality of sheaths 46 may need to be positioned on coolant channels 12 such that coolant channels 12 are substantially covered by sheaths 46. Sheaths 46 "float" on coolant channels 12, decoupling thermal expansion differences between sheaths 46 and coolant channels 12 and eliminating ceramic/metal joints.

Figure 3:
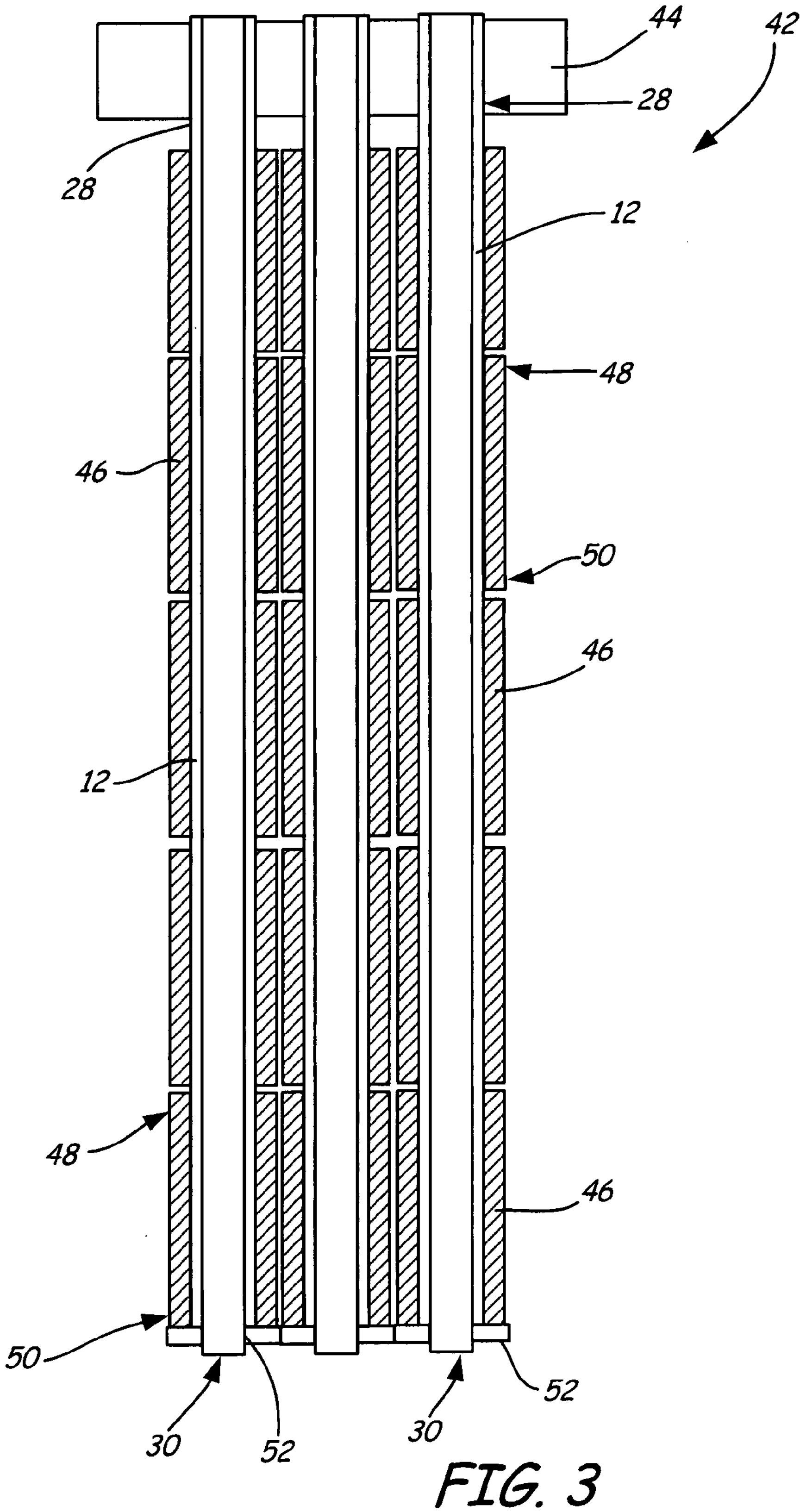
FIG. 3 is a partial cross-sectional view of the first embodiment of the coolant channels and liner.

FIG. 3 shows a partial cross-sectional view of the first embodiment of coolant channels 12 and liner 42. Liner 42 includes plurality of sheaths 46 slipped over each of coolant channels 12 and are maintained in position by tips 52. Head ends 48 and aft ends 50 of sheaths 46 have the same diameter. When head ends 28 of coolant channels 12 are positioned within flange 44, they are spaced apart to allow room for sheaths 46 to be positioned over each of coolant channels 12. Depending on the length of coolant channels 12 and the length of sheaths 46, multiple sheaths 46 may need to be positioned around coolant channels 12 to substantially cover coolant channels 12. Sheaths 46 must cover approximately 100% of the exposed area of coolant channels 12. Thus, all of coolant channels 12 other than the area exposed to the gasification reaction in gasifier 10 (shown in FIG. 1) must be covered by sheaths 46. Only head end 28 shielded by injector 20 and mounting flange 44 (shown in FIG. 1), and aft end 30 shielded by the expanding coolant and/or quench spray may be uncovered. In addition, a small area at head ends 28 and aft ends 30 of coolants channels 12 may also need to remain exposed, depending on how coolant channels 12 are positioned within gasifier 10. As previously mentioned, sheaths 46 may be formed of monolithic ceramic or a ceramic matrix composite. The benefit of forming sheaths 46 of a fiber reinforced ceramic is that the material is tougher and less brittle than monolithic ceramics. Although FIG. 3 depicts all sheaths 46 of liner 42 as having the same length, sheaths 46 may be of different lengths without departing from the intended scope of the present invention.

Sheaths 46 may be positioned onto coolant channels 12 either by slipping sheaths 46 around coolant channels 12 from head end 28 toward aft end 30, or from aft end 30 toward head end 28. After enough sheaths 46 have been slipped over coolant channels 12 to cover substantially all of coolant channels 12, tips 52 are used to keep sheaths 46 in place on coolant channels 12. Tips 52 may be connected to coolant channels 12 in any manner known in the art, including, but not limited to: welding and brazing.

Figure 4A:
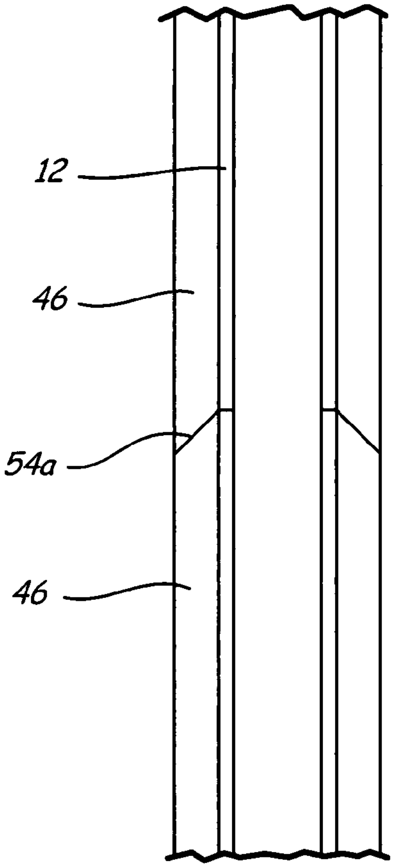
FIG. 4A is an enlarged view of a first embodiment of a joint of the liner.
Figure 4B:
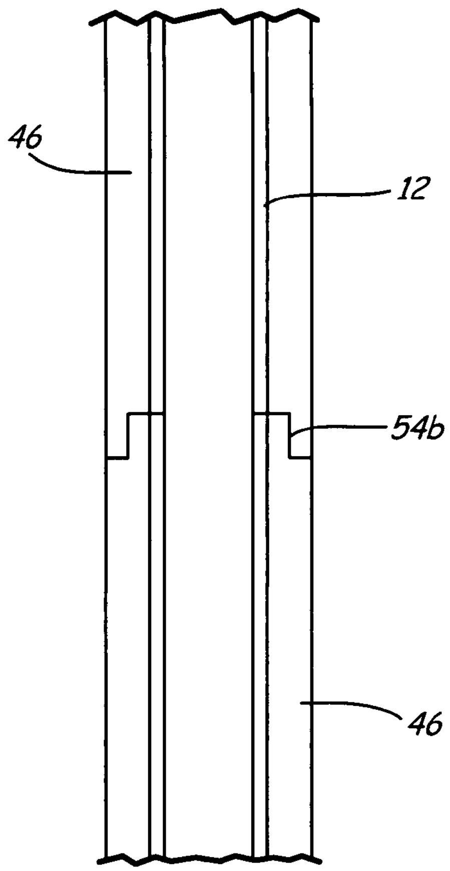
FIG. 4B is an enlarged view of a second embodiment of a joint of the liner.

FIGS. 4A and 4B show enlarged views of a first embodiment and a second embodiment, respectively, of a joint 54 of liner 42, and will be discussed in conjunction with one another. As shown in FIG. 3, multiple sheaths 46 may be needed to cover coolant channels 12. In order to adequately protect coolant channels 12 from the chemicals of gasifier 10 (shown in FIG. 1), joints 54 are used to adequately join and seal adjacent sheaths 46 to one another on coolant channels 12. Two embodiments of applicable joints 54 are bevel joints 54*a* (FIG. 4A) and rabbet joints 54*b* (FIG. 4B). Although FIGS. 4A and 4B depict bevel joints and rabbet joints for connecting sheaths 46, any joints known in the art may be used without departing from the intended scope of the present invention.

Figure 5:
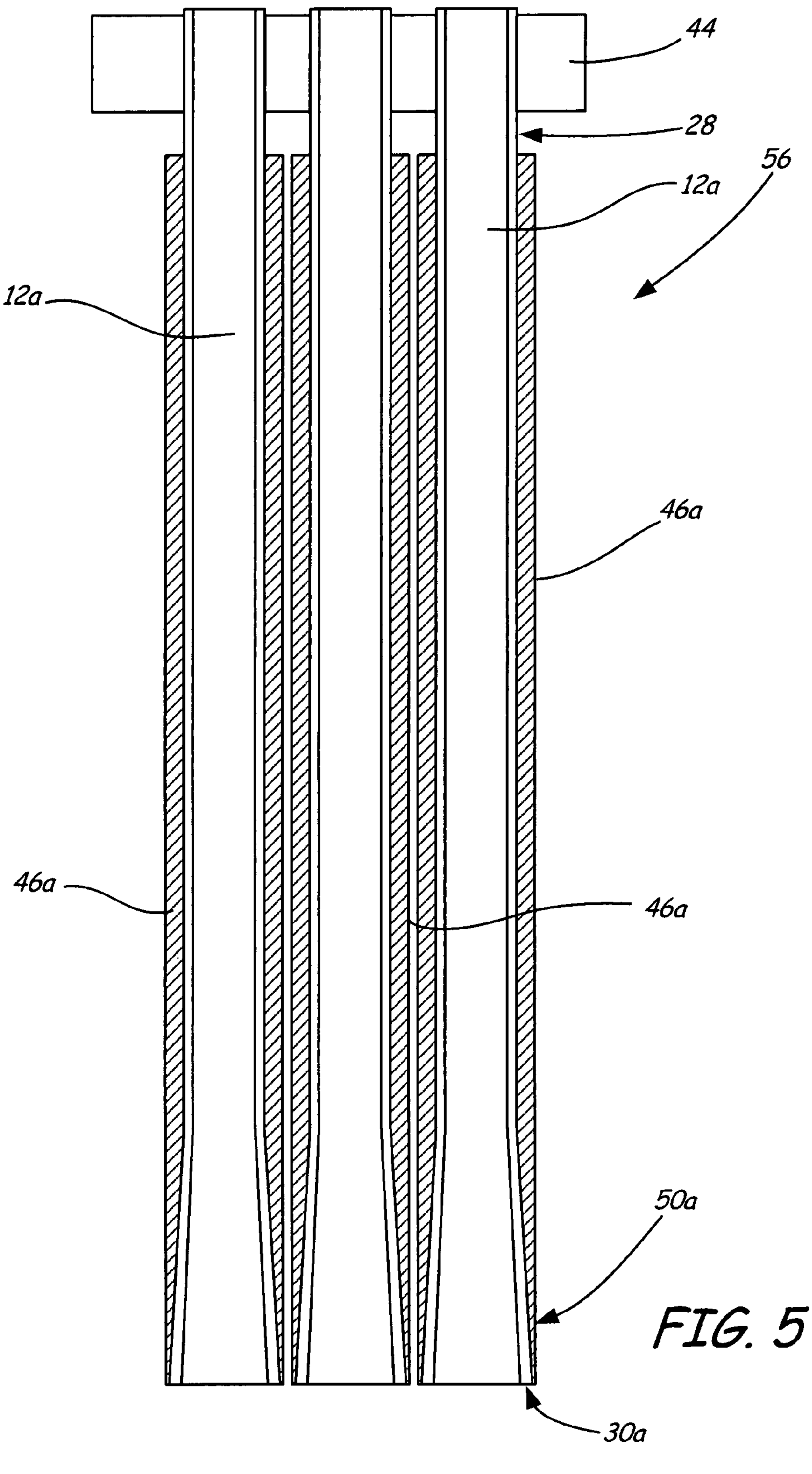
FIG. 5 is a partial cross-sectional view of a second embodiment of coolant channels and liner.

FIG. 5 shows a partial cross-sectional view of a second embodiment of coolant channels 12*a* and liner 56. Liner 56 is also formed of a plurality of sheaths 46*a* housing coolant channels 12*a*. Coolant channels 12*a* and sheaths 46*a* interact and function in the same manner as coolant channels 12 and sheaths 46 except that aft ends 30*a* of coolant channels 12*a* are flared to maintain sheaths 46*a* in position on coolant channels 12*a* without the use of tips. Accordingly, because aft ends 30*a* of coolant channels 12*a* are flared, aft ends 50*a* of sheaths 46*a* must also be flared in order to slip over aft ends 30*a* of coolant channels 12*a*. Although FIG. 5 depicts sheaths 46*a* as being single pieces, a plurality of sheaths 46 may be used to protect channels 12*a*, as long as sheaths 46*a* having flared aft ends 30*a* are positioned over flared aft ends 30*a* of coolant channels 12*a*. In addition, although FIGS. 1-5 depict coolant channels of a dump-cooled gasifier, the liners described are applicable to coolant channels having any configuration. For example, the liners may also be used in a gasifier that utilizes a conventional heat exchanger design in which aft end 30 of coolant channels 12 are joined together in at least one manifold.

Metal and ceramic joining issues, leakage issues, and thermal growth mismatch issues prevalent in gasifiers can either be reduced or eliminated by using a liner formed of ceramic sheaths positioned over coolant channels of the gasifier. The ceramic sheaths may be formed of a monolithic ceramic or a ceramic matrix composite. The ceramic sheaths surround the coolant channels and cover substantially the entire length of the coolant channels. The liner may be used in gasifiers having coolant channels of various configurations.

Although the present invention has been described with reference to preferred embodiments, workers skilled in the art will recognize that changes may be made in form and detail without departing from the spirit and scope of the invention.

The invention claimed is:

1. A liner for use within a gasifier vessel, the liner comprising:

a plurality of elongated channels having an inner surface and an outer surface for passing coolant through the gasifier vessel; and a plurality of ceramic sheaths covering the elongated channels and aligned with each other to form a circular cross section and define an inner surface and outer surface of the liner, wherein each sheath covers one of the elongated channels, and wherein the sheaths are in thermal communication with the elongated channels so that the inner surface of the liner is cooled by coolant flowing through the elongated channels and slag is frozen onto the inner surface of the liner, and wherein the sheaths and the elongated channels are decoupled, wherein the plurality of elongated channels are tubes, wherein each tube includes a respective tip flange at an end thereof, wherein each of the plurality of sheaths are supported on the respective tip flange.

2. The liner of claim 1, wherein the ceramic sheaths are formed of at least one of the group consisting of: a ceramic and a ceramic matrix composite.

3. The liner of claim 1, wherein the ceramic sheaths covering a single elongated channel are segmented.

4. The liner of claim 3, wherein the ceramic sheaths covering a single elongated channel are connected to each other by at least one of the group consisting of: bevel joints and rabbet joints.

5. The liner of claim 1, wherein the elongated channels extend along a length of the liner.

6. The liner of claim 1, and further comprising a first tip circumferentially surrounding only one elongated channel of the plurality of elongated cooling channels and maintaining one ceramic sheath of the plurality of ceramic sheaths in position over the one elongated channel.

7. The liner of claim 1, wherein the ceramic sheaths float on the elongated cooling channels.

8. The liner of claim 1, wherein the plurality of ceramic sheaths have a non-uniform axial length relative to one another.

9. The liner of claim 1, wherein the plurality of elongated channels are formed of metal.

10. The liner of claim 1, wherein the plurality of elongated channels are tubes arranged parallel to one another, and are spaced apart from each other.

11. The liner of claim 10, wherein the plurality of elongated channels are disposed in a cylindrical arrangement.

12. A gasifier comprising:

a vessel;

a plurality of elongated channels housed within the vessel, wherein each of the elongated channels has a head end, an aft end, an inner surface and an outer surface;

a metal flange for connecting the head ends of each of the elongated channels;

a plurality of ceramic sheaths, each sheath decoupled from but surrounding one of the plurality of elongated channels, wherein the ceramic sheaths are aligned with each other to form a circular cross section; and a liner having an inner surface defined by the plurality of ceramic sheaths, wherein the ceramic sheaths are positioned to be cooled by coolant flowing through the elongated channels so that slag freezes onto the inner surface of the liner, wherein a plurality of tips supporting the plurality of ceramic sheaths are attached to the plurality of elongated channels at the aft ends of the plurality of elongated channels.

13. The gasifier of claim 12, wherein the ceramic sheaths surrounding a single elongated channel are segmented.

14. The gasifier of claim 13, wherein the ceramic sheaths surrounding a single elongated channel are connected to each other by at least one of the group consisting of: bevel joints and rabbet joints.

15. The gasifier of claim 12, wherein the ceramic sheaths are formed of at least one of the group consisting of: a monolithic ceramic and a ceramic matrix composite.

16. The gasifier of claim 12, and further comprising a plurality of tips for maintaining the ceramic sheaths in position over the elongated channels, wherein each tip is positioned over only one elongated channel.

17. The gasifier of claim 12, wherein the ceramic sheaths float on the elongated cooling channels.

18. The gasifier of claim 12, wherein the plurality of ceramic sheaths have a non-uniform axial length relative to one another.

19. The gasifier of claim 12, wherein an axially aft end of channel suspended in the vessel and in fluid communication with the vessel.

20. The gasifier of claim 12, wherein the plurality of elongated channels are formed of metal.

21. The gasifier of claim 12, wherein a plurality of tips supporting the plurality of ceramic sheaths are stacked on the plurality of elongated channels.

22. A gasifier comprising:

a vessel;

a plurality of elongated channels housed within the vessel, wherein each of the elongated channels has a head end, an aft end, an inner surface and an outer surface;

a metal flange for connecting the head ends of each of the elongated channels;

a plurality of ceramic sheaths, each sheath decoupled from but surrounding one of the plurality of elongated channels, wherein the ceramic sheaths are aligned with each other to form a circular cross section; and a liner having an inner surface defined by the plurality of ceramic sheaths, wherein the ceramic sheaths are positioned to be cooled by coolant flowing through the elongated channels so that slag freezes onto the inner surface of the liner, wherein aft ends of the plurality of elongated channels are suspended within the vessel, wherein the plurality of elongated channels are arranged to communicate coolant into the vessel at the aft end.

* * * * *